Aug. 14, 1951
C. L. HALL
2,564,643
FASTENER DEVICE
Filed July 23, 1946
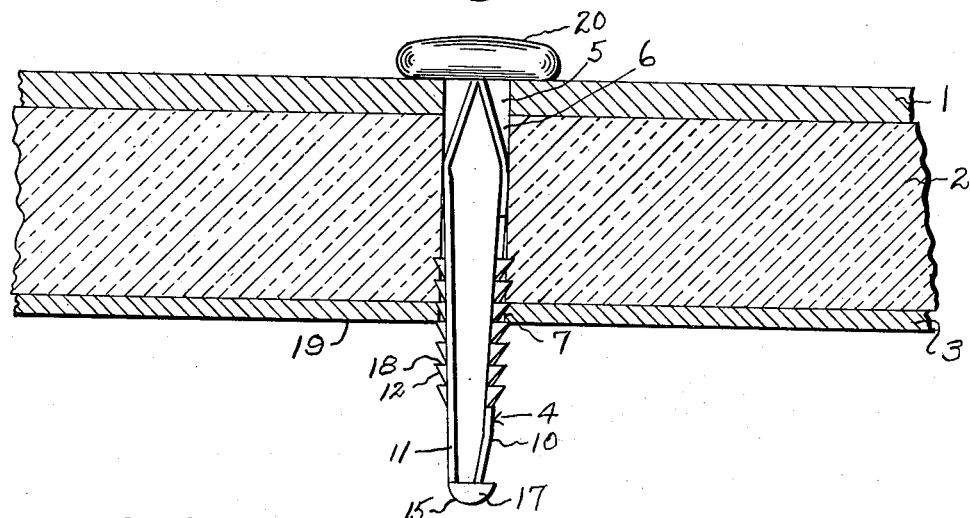
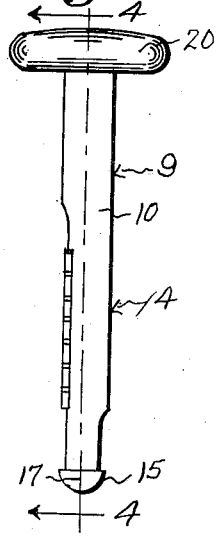
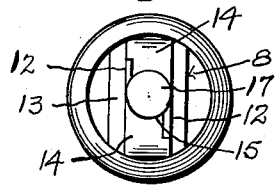
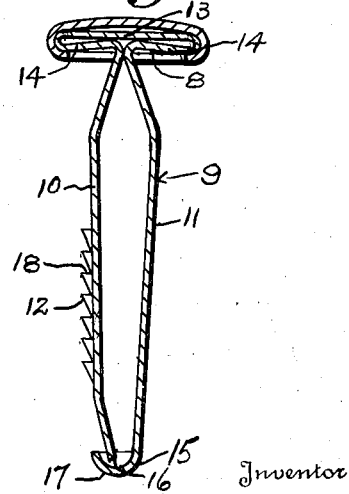
Inventor
Charles L. Hall.
By John Todd
Attorney Patented Aug. 14, 1951

2,564,643

UNITED STATES PATENT OFFICE 2,564,643

FASTENER DEVICE

Charles L. Hall, Detroit, Mich., assignor to United-Carr Fastener Corporation, Cambridge, Mass., a corporation of Massachusetts Application July 23, 1946, Serial No. 685,613

1 Claim. (Cl. 85—5)

This invention relates to improvements in fastener members of the type illustrated in United States Patent No. 2,229,996, issued January 28, 1941, to Wilmer H. Churchill.

This form of adjustable fastener is adapted particularly for securing a part such as the floor or dash mat of an automobile to the automobile body. When in use in such an installation the outermost ends of the legs of the fasteners project through the body into the engine section. It has been found that mechanics working under the hood have come into contact with these fasteners and been scratched by the relatively sharp free ends of the fastener legs. Consequently, one of the objects of my present invention is to provide a blunt portion at the free ends of the fastener legs which will operate as a shield to prevent injurious contact with said ends.

Other objects and uses of my invention will be apparent from inspection of the drawing and specification hereinbelow set forth.

Referring to the drawing in which I have illustrated a preferred embodiment of my invention:

Fig. 1 is a section through an installation of my improved fastener;

Fig. 2 is a side elevation of my improved fastener;

Fig. 3 is a bottom view of the fastener illustrated in Fig. 2; and

Fig. 4 is a section taken along the line 4—4 of Fig. 2.

Referring to Fig. 1 in which I have illustrated a preferred use of my invention, I have shown a part, such as a floor mat, which may comprise an outer panel 1 and an insulating panel 2 which is secured to the support 3, which may be the dash liner of the automobile, by means of the fastener member 4. The mat is disposed in superposed relation to the support 3 and the parts 1 and 2 have respective aligned openings 5 and 6 in line with an opening 7 of the support 3.

The particular fastener illustrated is formed from a single piece of metal and has a base 8 (Fig. 4) and a shank 9 formed of a pair of opposed narrow yieldable legs 10 and 11. Series of teeth 12 extend from each of the legs 10 and 11 for ratchet engagement with the support 3, as will be understood by those skilled in the art. The base 8 in my preferred form comprises a substantially flat portion 13 having portions 14—14 integral with its opposed ends and bent underneath the portion 13. The legs 10 and 11 extend from the innermost ends of the portions 14—14 and project outwardly in substantially normal relation to the general plane of the base with the inner broad surfaces in facing relation, as most clearly shown in Fig. 4. The legs 10 and 11 in my preferred form diverge from the inwardly extending portions 14—14 and then converge toward the end of the shank 9 away from the base 8.

At the outermost end of the leg 11 I have provided a shield in the form of a cupped element 15 which extends laterally from the outer end of the leg 11 in the direction of the cooperating leg 10 in a general plane which is normal to that of the shank 9. The cupped element 15 extends beneath and beyond the outermost end 16 of the leg 10 and is so arranged with respect to the outer end 16 of the leg 10 that the end 16 is disposed within the hollow of the cupped element thereby completely shielding the end 16. The lower surface 17 of the element 15 which is convex in shape effects a blunt end or shield at the outer end of the shank 9 which serves to prevent contact by an individual working in the vicinity of the fastener with the relatively sharp end 16.

In assembling the parts of the installation the shank 9 of the fastener is moved through the aligned openings 5, 6 and 7 of the parts to be secured. During this action the legs 10 and 11 are compressed until the fastener has been extended a desired distance along its length at which time the legs expand to engage the shoulders 18 of the teeth 12 behind the lower surface 19 of the panel 3. Thus the floor mat is held in place between the base 8 of the fastener and the shoulders 18 of the teeth elements. When the fastener is in final assembled position a substantial portion of the length of the shank 9 will, in most instances, extend beyond the lower surface 19 of the support 3, as illustrated in Fig. 1. As previously described, however, the cupped element 15 acts as a shield to prevent contact with the end 16 of the fastener leg 10 and in addition serves to blunt the outermost end of the leg 11 to which it is joined. If desired, a cap 20 may be applied to the base 8 so as to give a finished appearance to the fastener on the inner side of the automobile.

Although I have illustrated and described a preferred embodiment of my invention, I do not wish to be limited thereby, because the scope of my invention is best defined by the following claim.

I claim:

A fastener having a head and a shank disposed normal to said head, said shank comprising opposed leg portions extending from said head, said legs being formed from relatively thin metal and being many times greater in width than in thickness with their widest faces being substantially flat and disposed in opposed spaced apart relationship for the greater portions of their lengths for yieldable movement toward each other, a semi-spherical cup-shaped member extending laterally from the outer end of one of said legs toward the other leg and having a convexly curved bottom providing a smooth rounded end for said shank and a cavity opening inwardly of said rounded end, the other said leg having its end away from said head inclined inwardly and loosely confined within said cavity, each of said legs having a series of teeth extending outwardly beyond the plane of said leg for engagement with the walls of an aperture in which such fastener may be inserted, said teeth extending beyond the general rectangular margin of said shank as defined by a cross-section through said bowed legs, and said cup-shaped element being contained within said rectangular margin.

CHARLES L. HALL.

REFERENCES CITED

The following references are of record in the file of this patent:

UNITED STATES PATENTS

| Number | Name | Date |
|---|---|---|
| 381,513 | Twitchell | May 17, 1888 |
| 1,056,452 | Remhilt | Mar. 18, 1913 |
| 1,400,409 | Board | Dec. 13, 1921 |
| 2,110,959 | Lombard | Mar. 15, 1938 |
| 2,137,210 | Lombard | Nov. 15, 1938 |
| 2,142,429 | Wiley | Jan. 3, 1939 |
| 2,208,878 | Wiley | July 23, 1940 |
| 2,229,996 | Churchill | Jan. 28, 1941 |
| 2,268,873 | Place | Dec. 30, 1941 |
| 2,391,298 | Davis | Dec. 18, 1945 |